(12) United States Patent
Srivastava

(10) Patent No.: US 10,963,745 B2
(45) Date of Patent: Mar. 30, 2021

(54) REAL TIME ADAPTIVE TRAINING FACE DETECTION FOR ULTRA LOW POWER ALWAYS ON ARCHITECTURE

(71) Applicant: Intel Corporation, Santa Clara, CA (US)

(72) Inventor: Charu Srivastava, San Jose, CA (US)

(73) Assignee: Intel Corporation, Santa Clara, CA (US)

(*) Notice: Subject to any disclaimer, the term of this patent is extended or adjusted under 35 U.S.C. 154(b) by 156 days.

(21) Appl. No.: 16/198,580

(22) Filed: Nov. 21, 2018

(65) Prior Publication Data

US 2019/0087690 A1    Mar. 21, 2019

(51) Int. Cl.
| | | |
|---|---|---|
| *G06K 9/00* | (2006.01) | |
| *G06K 9/62* | (2006.01) | |
| *G06F 1/3231* | (2019.01) | |
| *G06F 1/3296* | (2019.01) | |

(52) U.S. Cl.
CPC ......... *G06K 9/6262* (2013.01); *G06F 1/3231* (2013.01); *G06F 1/3296* (2013.01); *G06K 9/00228* (2013.01); *G06K 9/00255* (2013.01); *G06K 9/6253* (2013.01); *G06K 9/6257* (2013.01); *G06K 2209/27* (2013.01)

(58) Field of Classification Search
None
See application file for complete search history.

(56) References Cited

U.S. PATENT DOCUMENTS

| | | | | |
|---|---|---|---|---|
| 10,681,313 | B1* | 6/2020 | Day | H04N 5/23274 |
| 2012/0287035 | A1* | 11/2012 | Valko | G06F 1/3231 |
| | | | | 345/156 |
| 2014/0067679 | A1* | 3/2014 | O'Reilly | G06Q 20/40145 |
| | | | | 705/44 |
| 2014/0267811 | A1* | 9/2014 | Bhat | H04N 5/23267 |
| | | | | 348/208.16 |
| 2017/0132466 | A1* | 5/2017 | Gousev | H04N 5/23218 |
| 2018/0004275 | A1* | 1/2018 | Tubbs | G06K 9/00255 |
| 2018/0173933 | A1* | 6/2018 | Gousev | G06K 9/00281 |
| 2018/0173948 | A1* | 6/2018 | Gousev | H04N 5/33 |
| 2018/0173986 | A1* | 6/2018 | Gousev | G06K 9/00617 |
| 2018/0331833 | A1* | 11/2018 | Tomlinson | H04L 9/0894 |
| 2019/0213309 | A1* | 7/2019 | Morestin | G01S 7/4808 |
| 2019/0213420 | A1* | 7/2019 | Karyodisa | G06K 9/00288 |
| 2020/0084388 | A1* | 3/2020 | Iinuma | G06F 21/81 |

OTHER PUBLICATIONS

Savakis et al. "Low Vision Assistance Using Face Detection and Tracking on Android Smartphones", 2012 IEEE (Year: 2012).*

* cited by examiner

*Primary Examiner* — Randolph I Chu
(74) *Attorney, Agent, or Firm* — Green, Howard & Mughal LLP.

(57) ABSTRACT

Techniques related to implementing an always on face detection architecture at ultra low power are discussed. Such techniques include updating a face detection model at a host processor using positive and/or negative validation of face detection results from an always on microcontroller operating at ultra low power.

21 Claims, 8 Drawing Sheets

REAL TIME ADAPTIVE TRAINING FACE DETECTION FOR ULTRA LOW POWER ALWAYS ON ARCHITECTURE

BACKGROUND

In some devices, face detection is run at all times (e.g., when the device has a display light that is dimmed, is placed in sleep or modern standby mode, etc.) to bring the device out of the low power mode when a face is detected. Thereby, the device is more user aware and power efficient as unnecessary power cycles are not used when a user is not engaging with the device. Current face detection systems have limitations in the context of such low power use cases. Some require high computational complexity and/or have limitations in accuracy of face detection.

Therefore, current techniques for face detection and/or recognition are not suitable for always on device capabilities. It is with respect to these and other considerations that the present improvements have been needed. Such improvements may become critical as the implementation of always on devices in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
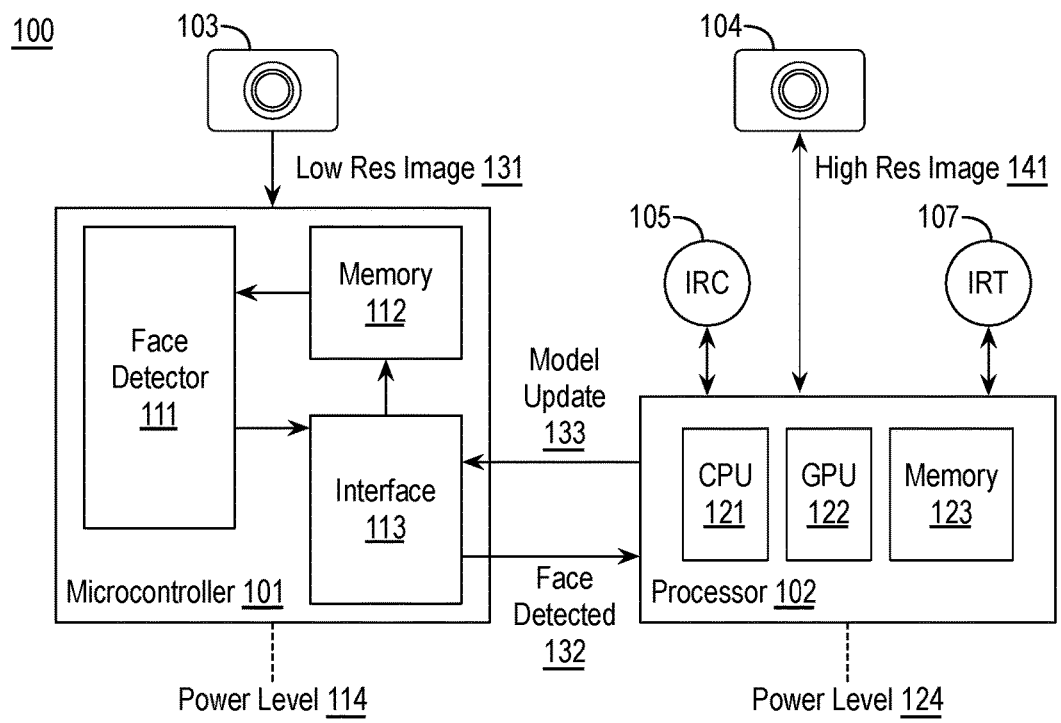
FIG. 1 illustrates an example system for providing always on face detection.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as multi-function devices, tablets, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", or examples, or embodiments, etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein. The terms "substantially," "close," "approximately," "near," and "about," generally refer to being within +/−10% of a target value. The term "satisfies" when used in reference to a threshold indicates the value in question meets the condition established by the threshold. The terms "compares favorably" when used in reference to a threshold indicates the value in question is greater than or greater than or equal to the threshold. Similarly, the terms "compares unfavorably" when used in reference to a threshold indicates the value in question is less than or less than or equal to the threshold.

Methods, devices, apparatuses, computing platforms, and articles are described herein related to always on face detection and, in particular, to real time training of face detection models for use by a low power microcontroller.

As described above, it may be desirable to provide an always on capability for devices, such as personal computers, such that the device is always available to the presence of a face. Upon detection, the device may transition to a higher power state. For example, after detection of a face by a low power microcontroller, the device may power up a high power processor such as a microprocessor core for validation of a detected face, presentation of a login prompt, etc. As used herein, the terms low power and high power are meant to indicate the low power device (e.g., integrated circuit chip) operates at a substantially lower power than a high power device (e.g., integrated circuit chip). For example, a ultra low power device may operate at a power in the range of 0 mW to 100 mW, such as at or below 10 mW, and a high power device may operate at a power of greater than 1 W such as 2 W, or more. Notably, the always on capability may be provided at ultra low power while the high power device may operate at a normal power for the device. Although discussed with respect to personal computer applications, the discussed systems and techniques may be applied in any suitable form factor. As used herein, the term personal computer indicates a device having a size and form factor that make it suitable for use by a single person, such as a desktop computer, a laptop computer, a netbook, a tablet, etc.

The techniques discussed herein provide for face detection at ultra low power (e.g., <100 mW or <10 mW) in the context of an always on architecture. As discussed herein, an optimized and adaptive face detection model that fits in a limited memory allocation (e.g., not more than 512 Kb of memory footprint) and may be implemented in a limited compute environment is implemented to detect and learn facial features of a primary user under different lighting conditions. Furthermore, the techniques discussed herein improve a pre-trained face model based on the primary device user and may adaptively change the training model based on the environment and usage context for face detection. For example, in the case of face detection under certain lighting conditions, an optimal face detection model may be selected from two or more face detection models and the chosen face detection model may be applied for improved face detection. Based on training using images of the primary user and/or optimizing the performance of existing face models under different lighting conditions improves face detection performance over time in terms of overall accuracy and precision of the inference solution for the ultra-low power always on architecture.

In some embodiments, a microcontroller implements, at a low power level, a face detection model on a low resolution image. When a face is detected by the microcontroller, a face detection signal is provided to a processor coupled to the microcontroller. The processor, in response to the face detection signal, implement, at a high power level (greater than the low power level), another face detection model on a high resolution image to validate the face detection signal. Based on the validation (e.g., either positive validation that a face was indeed detected or validation of a false positive that a face was not detected), an update to the face detection model implemented by the microcontroller is generated. The update is then stored to the microcontroller for implementation at a subsequent low power state of the device.

In an embodiment, based on multiple positive validations, new face detection model may be generated such that images corresponding to the multiple positive validations (e.g., high resolution images) are used as at least a portion of a training set to train a new face detection model. In an embodiment, the high resolution are downsampled prior to training. In addition, metadata (e.g., location, time, result of detection that is validated, etc.) corresponding to the images may be used in the training. For example, the training set may comprise only images having shared metadata features. As used herein, a metadata feature indicates a feature that corresponds to the image but is not part of the image data such as a time of day the image was acquired, an illumination condition under which the image was acquired), a geographic location at which the image was acquired, etc. Multiple face detection models may be generated such that each corresponds to a different metadata feature or feature set. For example, a morning face detection model (e.g., having images acquired from 7 AM to 9 AM), a midday face detection model (e.g., having images acquired from 11 AM to 1 PM), and an evening face detection model (e.g., having images acquired from 4 PM to 7 PM) may be generated. In addition or in the alternative, an office detection model (e.g., having images acquired at a work location) and a home detection model (e.g., having images acquired at a home location) may be generated, and so on.

In implementation or at inference, the pertinent face detection model may be used by the microcontroller in the low power state of the device. For example, when in a high power state, the pertinent face detection model may be stored to the microcontroller. As used herein, the term store used in context to storing a face detection model indicates the model is stored, either by transmission by one device to another or by retrieval by a device from the other device or an intermediary device. Subsequently, in the low power state, the always on microcontroller may use the pertinent face detection model for face detection with the expectation that the device will be used under conditions for which the model was trained. For example, in a high power state after midday, an evening face detection model may be loaded and used for implementation in the evening. As will be appreciated, the face detection model may thereby be trained for detection under different lighting conditions or even a different face when the device is used by different people at different times of the day, at different locations, etc.

In other embodiments, based on one or more false positive detections, a new threshold for a face detection model may be determined in order to reduce the false positive rate. As used herein, a face detection model includes a default pre-trained model for comparison of input images from low resolution camera and a threshold for comparison of the result of the model comparison. For example, a face detection model may include a principal component analysis model (e.g., a linear discriminant model or Fisher linear discriminant model) such that an incoming image may be translated to a vector, normalized, and projected onto an Eigen space to determine a principal component vector for the incoming image. The resultant principal component vector is then compared to principal component vectors of the face detection model to determine a distance with respect to the face detection model. The face distance of the low power system image is then compared to the pre-trained model such that a Euclidean distance satisfies a threshold of the model for face detection. Therefore, the face detection model includes the principal component vectors of the face detection model and the threshold. As discussed, when false positives are detected, an update to the face detection model may include tuning the threshold and updating it to the microcontroller.

Other model updates as discussed herein may be used in addition to or in the alternative to the discussed embodiments. The discussed techniques may be used in personal computer or other device applications to provide a stand-alone always on (AON) capability for the device that consumes very little power and allows the host processor to enter a modern standby low power state where the PC can enter sleep state operating in milliWatt range at the same time still actively looking for face detection.

FIG. 1 illustrates an example system 100 for providing always on face detection, arranged in accordance with at least some implementations of the present disclosure. As shown in FIG. 1, system 100 includes a microcontroller 101 coupled to a processor 102. In some embodiments, microcontroller 101 is an integrated circuit or chip and may be characterized as a monolithic integrated circuit. In some embodiments, microcontroller 101 is a portion of a host processor that also includes processor 102. Microcontroller 101 may be characterized as an ultra low power companion processor to processor 102. Notably, microcontroller 101 operates at a power level 114 that is low and may be characterized as ultra low (e.g., less than 100 mW). In an embodiment, processor 102 is a physically separate integrated circuit or chip that is coupled to microcontroller 101. In another embodiment, microcontroller 101 is a portion or subcomponent of a host processor that also includes processor 102. In some embodiments, where processor 102 and microcontroller 101 are separate physical entities, processor 102 may also be characterized as a monolithic integrated circuit. Processor 102 may be characterized as a host processor with respect to microcontroller 101. Notably, processor 102, when powered on, operates at a power level 124 that is a standard power level for processor operation. Although illustrated with respect to operation at power level 124, processor 102 may be capable of operation at multiple power levels according a power management protocol. Notably, processor 102 may enter a sleep state or modern standby mode at a very low power level when not in use. In such a low power state, system 100 may operate in an always on mode with processor 102 sleep state or in modern standby mode and microcontroller 101 operating at power level 114 to monitor the environment of system 100 for a human face.

Power level 114 and power level 124 may be any suitable power levels such that power level 114 is less than power level 124. In an embodiment, power level 114 is in the range of 5 mW to 100 mW. In an embodiment, power level 114 is not more than 50 mW. In an embodiment, power level 114 is not more than 10 mW. In an embodiment, power level 124 is not less than 1 W. In an embodiment, power level 124 is not less than 2 W. In an embodiment, power level 124 is not less than 0.5 W. In an embodiment, power level 114 is not more than 2% of power level 124. In an embodiment, power level 114 is not more than 1% of power level 124. In an embodiment, power level 114 is not more than 0.5% of power level 124. Microcontroller 101 may operate at any suitable clock speed or rate such as 50 Hz.

Microcontroller 101 includes a face detector 111, a memory 112, and an interface 113. Memory 112 stores a face detection model for implementation by face detector 111. When a face is detected, a face detection signal 132 (face detected), is provided by interface 113 to processor 102. For example, microcontroller 101 and processor 102 may be connected via a serial peripheral interface (SPI) connection, an inter-integrated circuit (I2C) connection, or a general purpose input/output (GPIO) connection. Furthermore, when a face detection model update 133 (model update) is received via interface 113 from processor 102, the face detection model update (e.g., principal component vectors of the face detection model, a threshold of the face detection model, or both) is stored to memory 112 for use by face detector 111. Notably, both principal component vectors of the face detection model and a threshold of the face detection model are needed for implementation of the face detection model but either the principal component vectors or the threshold or both may be part of an update. In an embodiment, memory 112 may include an allocation that limits microcontroller 101 to only be able to store a single face detection model. In some embodiments, two or more face detection models may be stored. In an embodiment, memory 112 includes a face detection model runtime memory allocation that is not more than 7 Kb. Memory 112 may include any suitable memory such as static random access memory (SRAM) and may have any storage space such as 512 KB.

As shown, microcontroller 101 is coupled to a camera 103. Camera 103 may include any suitable camera or camera module. In an embodiment, camera 103 is a low power camera only capable of attaining low resolution images 131 at a low frame rate (e.g., 30 fps). Low resolution images 131 may be any suitable resolution such as 320×240 pixels. In an embodiment, camera 103 is an RGB camera and low resolution images 131 are RGB images. In an embodiment, camera 103 is an IR camera and low resolution images 131 are IR images. Furthermore, processor 102 is coupled to a camera 104. Camera 104 may include any suitable camera or camera module. In an embodiment, camera 104 is a standard power camera (e.g., operating at higher power requirement than camera 103) and is capable of attaining full or high resolution images 141 at the same or a higher frame rate (e.g., 30, 60, or 90 fps). High resolution images 141 may be any suitable resolution such as 2048×1536 pixels. In an embodiment, camera 103 and camera 104 are physically distinct cameras. In another embodiment, the capabilities discussed with respect to cameras 103, 104 are provided by a single camera (e.g., a hybrid camera that can be downscaled to low resolution in a modern standby state and can perform at full resolution in a high power state. Furthermore, processor 102 may be coupled to an IR camera 105 (IRC) and an infrared transmitter 107 (IRT). In embodiments where camera 104 is an IR camera, IR camera 105 may not be included and, instead, an RGB camera may be implemented. IR transmitter may transmit an IR pattern for detection by IR camera 105 (or camera 104). Such components may be used in addition to camera 104 to perform or validate face detection.

Processor 102 may further include a central processing unit 121, a graphics processing unit 122, and a memory 123. In an embodiment, processor 102 is a processor core including central processing unit 121, graphics processing unit 122, and memory 123. In other embodiments, processor 102 includes only central processing unit 121 and graphics processing unit 122 is implemented separately from central processing unit 121. Memory 123 may be integrated, as shown, or memory 123 may be implemented separately from processor 102. Processor 102 may be characterized as a microprocessor, a central processor, a central processing unit, a host processor, a main host processor, etc.

Face detector 111 implements a current face detection model stored in memory 112. The face detection model may be any suitable face detection model such as a principal component analysis model (e.g., a Eigen or Fisher linear discriminant model). As used herein, the terms principal component analysis face detection model, principal component analysis model, linear discriminant model, and Fisher linear discriminant model are used interchangeably and indicate a machine learning pattern recognition procedure that transforms a number of (possibly) correlated variables into a (smaller) number of uncorrelated variables called principal components. Such techniques may be used to pre-train, in a training phase, a model including vectors (e.g., principal component vectors) representative of a training set of images and a threshold such that, in an implementation phase, a vector (e.g., a principal component vector) representative of an incoming image is compared or measured against the model vectors to determine a distance of the incoming image vector from the model vectors. The distance is then compared to the model threshold.

Figure 2:
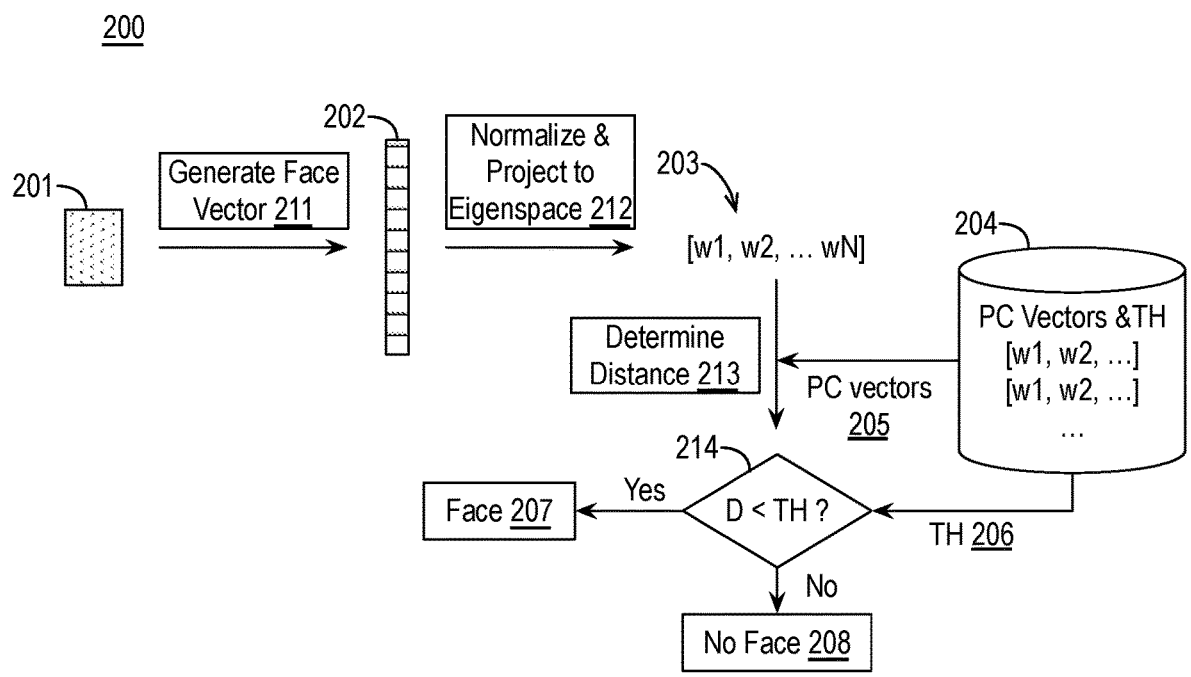
FIG. 2 illustrates an exemplary face detection method.

FIG. 2 illustrates an exemplary face detection method 200, arranged in accordance with at least some implementations of the present disclosure. For example, face detection method 200 may be performed by face detector 111 using a model stored in memory 112 to implement a principal component analysis face detection model. As shown in FIG. 2, an input image 201 is received for processing. Input image 201 may correspond to a selected one of low resolution images 131. In an embodiment, optional pre-processing is performed to crop one of low resolution images 131 to input image 201 or to otherwise modify the image. Input image 201 may be any suitable resolution such as a 320×240 pixel image or frame. In an embodiment, input image 201 includes a single (luminance) channel. Using input image 201, a face vector 202 is generated at operation 211. Face vector 202 may be generated using any suitable technique or techniques. In an embodiment, is a 1-dimensional scan (e.g., raster scan) of luminance values of input image 201. Face vector, at operation 212, may be normalized (e.g., an average face vector as provided by face detection model 204 may be subtracted from face vector 202) and projected onto an Eigen space as provided by face detection model 204 (e.g., based on Eigenvectors as provided by face detection model 204) to generate a principal component vector 203. Principal component vector 203 may be characterized as a characteristic vector or simply a vector. Principal component vector 203 is compared to principal component vectors 205 of face detection model 204 to determine, at operation 213, a distance, D, of principal component vector 203 from principal component vectors 205. Distance, D, may be determined using any suitable technique or techniques such as sum of squares of absolute differences techniques, etc. The distance, D, provides a measure of the difference between input image 201 and (pre-trained) face detection model 204 that may be used to detect a face (e.g., user presence). As shown at operation 214, if distance, D, satisfies a threshold 206 (e.g., D is less than threshold 206), a face is detected as shown at face detection 207. Otherwise, no face is detected as shown at no face detection 208.

As discussed, a pre-trained face detection model 204 is loaded into memory 112. In an embodiment, face detector 111 is implemented by microcontroller 101 and continuously runs the face detection process in firmware by implementing face detection model 204. Input images captured by camera 103 (e.g., a low power camera) are optionally pre-processed (e.g., cropped) to a region of interest. A distance between pre-trained face detection model 204 stored in memory 112 and the pre-processed image is determined. If the face distance is within pre-defined threshold 206 of pre-trained face detection model 204, a face is detected. As discussed, such inference processing may be performed at a power level of 10 mW power at 30 Hz using 7 Kb memory.

Returning to FIG. 1, as discussed, face detector 111 preforms inference based on low resolution images 131 to compare such input images to detect a human face. If no face is detected, face detector 111 continues to monitor low resolution images 131 (or input images corresponding to low resolution images 131) until a face is detected. When a face is detected, face detection signal 132 is provided, via interface 113, from microcontroller 101 to processor 102. Face detection signal may be any suitable signal such as a general purpose input output (GPIO) signal. Face detection signal 132 may be characterized as a wake signal, power on signal, etc. In response to face detection signal 132, processor 102 powers up from a standby mode (e.g., an ultra low power state or modern standby mode) to power level 124. Processor 102 further provides face detection model updates 133 as discussed further herein. Face detection model updates 133 may be made using any suitable technique or techniques such as serial peripheral interface (SPI) write operations.

Figure 3:
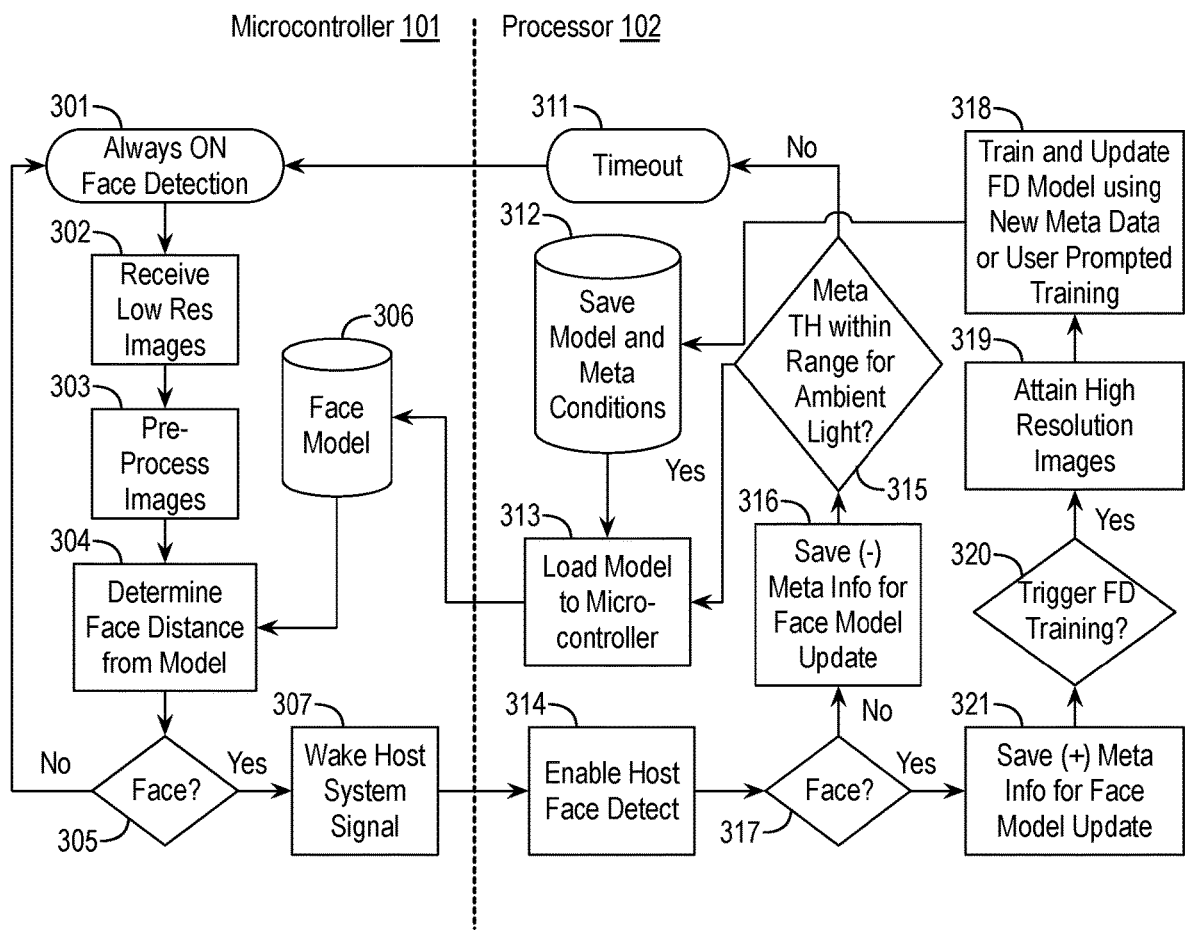
FIG. 3 illustrates exemplary inference processing performed by a microcontroller and exemplary face detection model update processing performed by a processor.

FIG. 3 illustrates exemplary inference processing performed by microcontroller 101 and exemplary face detection model update processing performed by processor 102, arranged in accordance with at least some implementations of the present disclosure. As shown in FIG. 3, microcontroller 101, via face detector 111 implementing a face detection model stored in memory 112 provides face detection (e.g., inference). For example, at operation 301, an always on face detection is implemented by microcontroller 101 in a low power mode of system 100. Such always on face detection may be initiated when processor 102 enters an ultra low power, low power, modern standby mode, or standby mode for example. In response to always on face detection being initiated, low resolution images are received at operation 302. For example, low resolution images 131 may be received from camera 103. At operation 303, the low resolution images are pre-processed (e.g., cropped to a region of interest). Using the pre-processed images a distance (e.g., face distance) from a pre-trained face detection model 306 is determined at operation 304, for example, as discussed with respect to FIG. 2 and compared to a threshold of the pre-trained face detection model 306 at operation 305. If a face is not detected, the always on face detection continues as discussed. If a face is detected, at operation 307, a wake host system signal (e.g., face detection signal 132) is provided to processor.

In response to the wake host system signal, processor 102 powers up from a modern standby mode, as discussed, and enables, at operation 314, a host face detection. Host face detection is performed by processor 102 at power level 124 using any suitable technique or techniques such that the host face detection implements a face detection model on an image having a higher resolution than that of the image used to perform face detection at microcontroller 102. In an embodiment, the host face detection implements a principal component analysis face detection model on a higher resolution image than that used in the principal component analysis face detection model used by microcontroller 102. In another embodiment, the host face detection implements a convolutional neural network face detection model. As used herein, the term convolutional neural network face detection model indicates any model that implements an artificial neural network to classify an input image. In yet other embodiments, IR face detection techniques may be used in the host face detection.

As shown at operation 317, a determination is made based on the host face detection as to whether a face is detected by processor 102. Such processing may be characterized as a validation of the face detection by microcontroller. As used herein the term validation indicates checking to determine the validity of a face detection and does not indicate the result (e.g., that the face detection is indeed validated). For example, validation may result in positive validation (e.g., that a face detection is accurate) or a false positive or negative validation (e.g., that a face detection is not accurate). As shown, if the validation results in a positive validation, at operation 321, metadata corresponding to the face detection (e.g., time of day, illumination condition, a geographic location, etc.), the threshold value of pre-trained face detection model 306, and an image of the face detection (e.g., a high resolution or low resolution image) are stored along with an indicator that the face detection was positive.

Processing continues at operation 320 where a determination is made as to whether face detection training has been triggered. For example, face detection training may be triggered when a threshold number of face detection signals have been received, when a threshold number of positive validation face detections have been made, when a threshold number of false positive validation face detections have been made, a user has demanded face detection training, etc. Such triggers are discussed further herein with respect to FIG. 6. If so, processing continues at operation 319, where images corresponding to positive validation face detections and/or current image capture is performed with a known user (e.g., at user request) to attain images known (or highly suspected) to include a common user of system 100. In addition, optionally metadata corresponding to the images may also be attained.

Processing continues at operation 318 where one or more face detection models are trained and/or updated using the discussed images and/or meta data. In some embodiments, the training is in response to a user demand. In such embodiments, operation 319 may include attaining one or more images of the user by having the user face camera 104 and perform image capture. Notably, metadata features may also be attached to such images based on the time, location, lighting, etc. of such pictures. Subsequently, training of the face detection model (as discussed further below) may be performed using the attained images of the user as at least part of a training set or corpus.

In addition or in the alternative, the training set or corpus may include images corresponding to positive validation face detections. That is, at positive validation of face detection, the image may be stored for training as discussed. Training of the face detection model may be performed using the saved images (suspected of having the face of a primary user) as at least part of a training set or corpus. Furthermore, metadata features may also be attached to such images based on the time, location, lighting, etc. of such pictures.

With respect to such metadata features any of the discussed images may be organized or binned according to the metadata features such that individual training sets are attained, each training set having one or more common metadata feature. For example, a first training set may have morning images, a second training set may have midday images, and so on. Furthermore such training sets may have combination of metadata features such as a first training set having morning-office images, a second training set having midday-office images, a third training set having morning-home images, etc. For example, each training set may have a distinct metadata feature or a distinct combination of two or more multiple metadata features.

Figure 4:
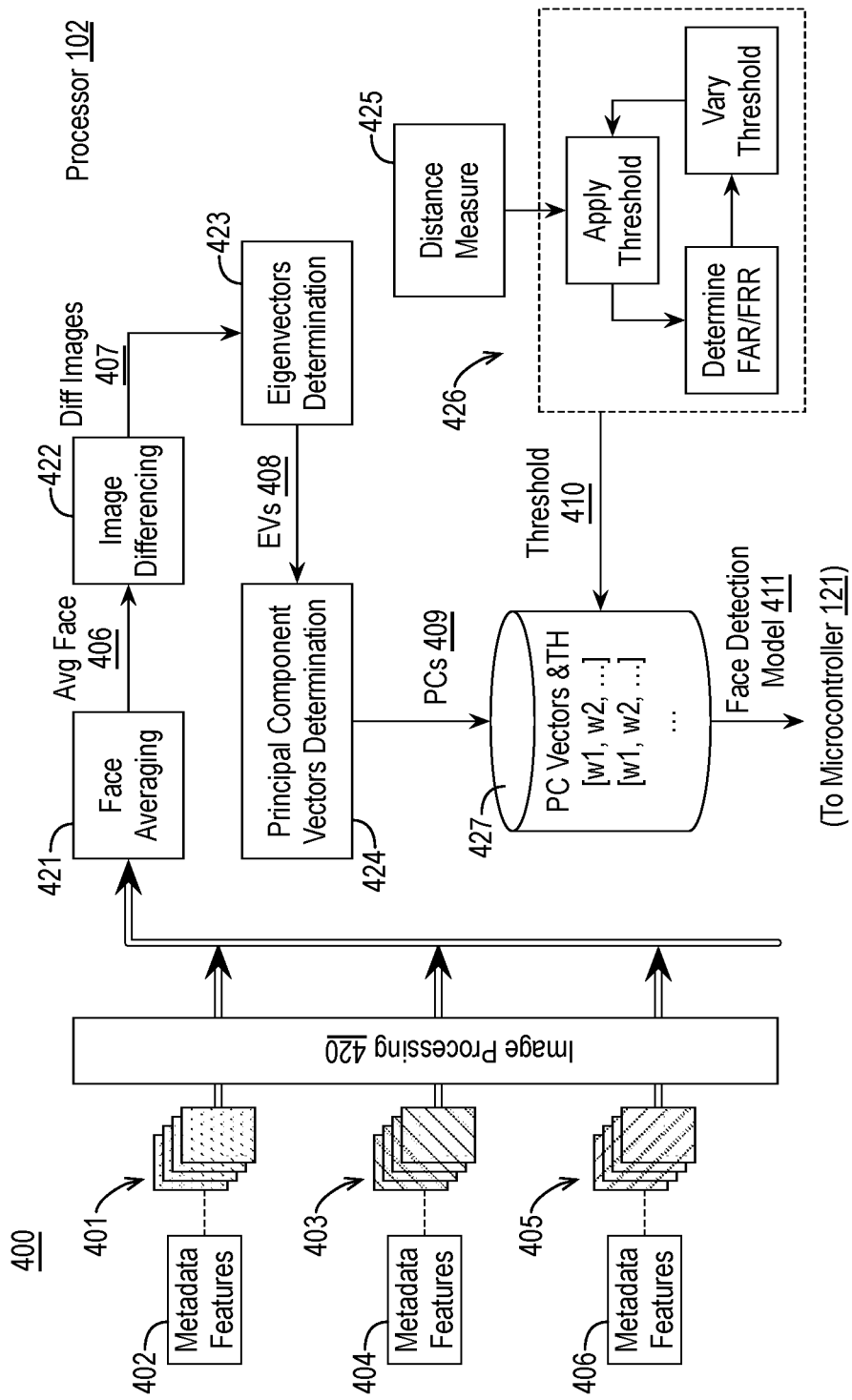
FIG. 4 illustrates exemplary face detection model training module.

FIG. 4 illustrates exemplary face detection model training module 400, arranged in accordance with at least some implementations of the present disclosure. For example, face detection model training module 400 may be implemented by processor 102 at power level 124 to generate a face detection model update. As discussed, a face detection model may include principal component vectors, a threshold, and other aspects that may be stored to microcontroller 101 for implementation during inference. As shown, face detection model training module 400 may train one or more training sets of images 401, 403, 405, which may have optional metadata features 402, 404, 406, respectively, corresponding thereto.

In an embodiment, face detection model training module 400 trains a single face detection model based on only training set of images 401. Any of training sets of images 401, 403, 405 may include any number of images such as 500-2,000 images. Generation of a face detection model 411 will now be discussed with respect to training set of images 401. As will be appreciated, such techniques may be used to generate any number of face detection models 411, each based on one of training sets of images 401, 403, 405. Furthermore, each of multiple face detection models 411 may correspond to one of metadata features 402, 404, 406 such that a face detection model 411 is generated for each instantiation of metadata features 402, 404, 406. Such face detection models 411 may then be implemented when the environment of system 100 corresponds to (or is expected to correspond to) one of metadata features 402, 404, 406, as is discussed further herein.

As shown, training set of images 401 is processed by image processing module 420. Image processing module 420 may perform any suitable preprocessing operations such as cropping to a detected region of interest or the like. At face averaging module 421, the processed training set of images 401 are used to determine an average face 406 of the faces in the training set of images 401. At image differencing module 422, each of the training set of images 401 are differenced with average face 406 to generate differential images 407. Such image differencing may be characterized as image normalization. At Eigenvectors determination module 423, are used to determine Eigenvectors 408 corresponding thereto. In an embodiment, differential images 407 are each formed into a corresponding vector (e.g., using raster scan techniques) and a covariance matrix including Eigenvectors 408 is determined using the differential image vectors (e.g., by solving $C=A^{T}A$ where A is a matrix of differential image vectors and C is the Eigenvectors matrix). At principal component vectors determination module 424, for each of the training set of images 401, a principal component vector is determined such that the principal component vector represents the image as a linear combination of Eigenvectors 408. As shown, the resultant principal component vectors 409 are stored to memory 427 as a face detection model 411. Furthermore, a threshold 410 for face detection model 411 may be determined via threshold generation module 426. As shown, at distance measure module 425, distances for training set of images 401 and optional false positive training images may be used to determine a distance for each. The distances and the know positive (and negative) results may then be used to determine threshold 410 in an iterative manner by applying a first threshold, determining false accept rate (FAR) and false rejection rate (FRR) based on the threshold and varying the threshold until the FAR and FRR are optimized. The false positive training images may be saved at operation 316 as discussed herein.

Returning to FIG. 3, as shown, after training face detection model 411, the updated face detection model(s) are stored to memory 312 and loaded, via operation 313, to microcontroller 101 to replace or update pre-trained face detection model 306. In some embodiments, only portions of pre-trained face detection model 306 are updated (e.g., the threshold is change). In other embodiments, the entirety of pre-trained face detection model 306 are updated (e.g., pre-trained face detection model 306). In either case, the modification of pre-trained face detection model 306 is characterized as an update herein.

Returning to operation 317, if the validation results in a false positive validation (e.g., the face is not validated), processing continues at operation 316, where metadata corresponding to the face detection (e.g., time of day, illumination condition, a geographic location, etc.) and an image of the face detection (e.g., a high resolution or low resolution image) are stored along with an indicator that the face detection was false or negative. Processing continues at operation 315, where a determination is made as to whether a pre-trained face detection model provides a negative face detection corresponding to the current image. If so, the pre-trained face detection model is loaded, via operation 313, to microcontroller 101 to replace or update pre-trained face detection model 306. Determining the pre-trained face detection model that provides a negative face detection corresponding to the current image may include determining only a threshold change for the current pre-trained face detection model or determining an entirely different pre-trained face detection model that provides a negative face detection corresponding to the current image. If not, no change is made to the threshold and processing continues at operation 311, where a timeout is reached, a signal is sent to microcontroller 101 to implement always on face detection, and processor 102 is returned to an ultra low power, low power, or standby power state.

For example, when processor 102 (e.g., the main processor of system 100) wakes up, control logic thereof may transfer a request to camera 104 (e.g., a high-resolution host camera) for auto login services. As discussed, processor 102, at power level 124, determines (at a higher level of confidence with respect to the processing at microcontroller 101), whether there is an actual face detected by camera 104 (e.g., using a more sophisticated in terms of compute requirement, larger in terms of memory size, etc. face recognition on a high-resolution image). Processor 102 stores positive metadata of the picture and the threshold value from microcontroller 101. As discussed, such data is later used to update (and improve) the current user pre-trained model. When a face is falsely detected (e.g., a false positive is detected), the metadata and threshold values are used as non-face data to train for negative conditions and improve the pre-trained model. In addition or in the alternative, based on the threshold value of the negative condition, a relevant model may be determined (e.g., for the current ambient conditions). The selected model meeting the threshold range is then provided for use by microcontroller 101.

Figure 5:
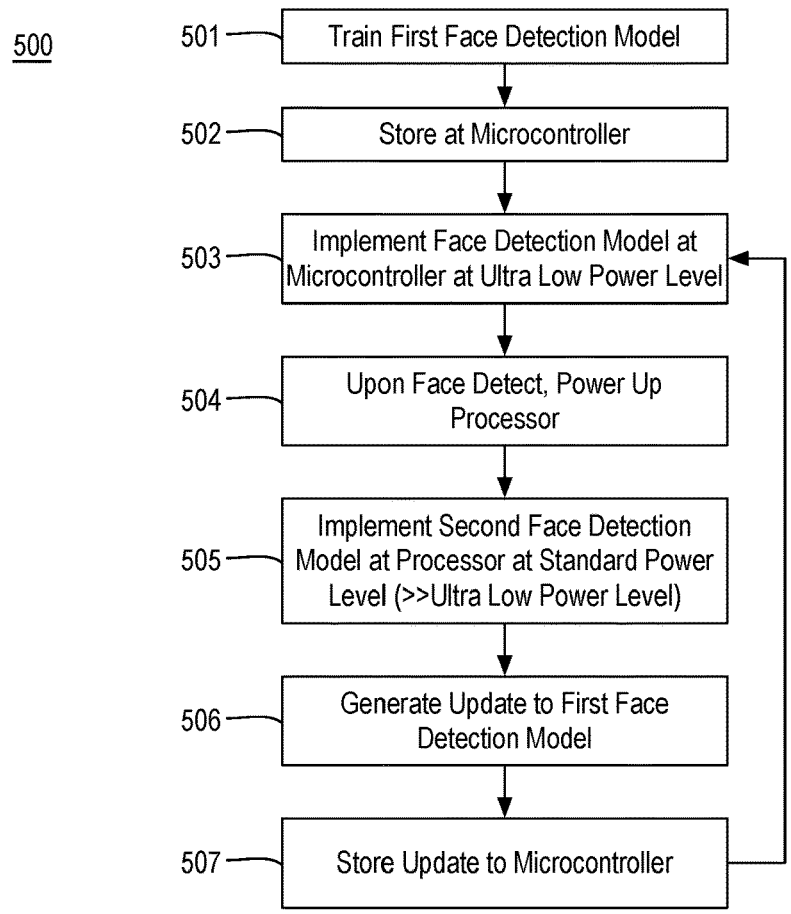
FIG. 5 is a flow diagram illustrating an example process for implementing and updating a face detection model at a low power microcontroller.

FIG. 5 is a flow diagram illustrating an example process 500 for implementing and updating a face detection model at a low power microcontroller, arranged in accordance with at least some implementations of the present disclosure. Process 500 may include one or more operations 501-507 as illustrated in FIG. 5. Process 500 or portions thereof may be performed by any device or system discussed herein, such as system 100.

Process 500 begins at operation 501, where a first face detection model is pre-trained using any suitable technique or techniques as discussed herein, such as those described with respect to FIG. 14. In an embodiment, the first face detection model is pretrained using a training corpus with no knowledge of the user or use patterns of system 100. For example, the first face detection model may be an initial face detection model. In an embodiment, the first face detection model is trained based on images previously attained by system 100 as discussed herein. Processing continues at operation 502, where the first face detection model is stored to microcontroller 101.

Processing continues at operation 503, where the first face detection model is implemented by microcontroller 101 at a first power level (e.g., at power level 114) as discussed herein. Processing continues at operation 504, where, upon face detection, processor 102 is powered up (e.g., from a low, standby, or ultra low power level to power level 124). Processing continues at operation 505, where a second face detection model is implemented at processor 102 operating at power level 124 (e.g., a higher power than power level 114) to validate the face detection.

Processing continues at operation 506, where an update to the first face detection model is generated. In an embodiment, the update includes a third face detection model generated based on a plurality of saved images from positive validations and negative validations. The images from positive validations are used as at least part of a training set to train the third face detection model such that the images from positive validations are used to determine an average face and so on. Furthermore, the images from negative validations are used as part of a test set to determine a threshold for the third face detection model (e.g., to evaluate false acceptances).

In an embodiment, the updated includes a third face detection model selected from a plurality of saved face detection models such that the selected model provides a negative result for the current images. For example, principal component analysis face detection models are sensitive to ambient lighting conditions. By updating the pre-trained face detection model (e.g., via a threshold change or an entire model replacement), increased accuracy and efficiency are provided.

Processing continues at operation 507, where the updated pre-trained face detection model is stored to microcontroller 101. Processing may further continue after a timeout duration or shutdown command or the like by ultra low power face detection being initiated at microcontroller 101 and processor 102 returning to the low, standby, or ultra low power level such that process 500 continues at operation 503 as shown.

Figure 6:
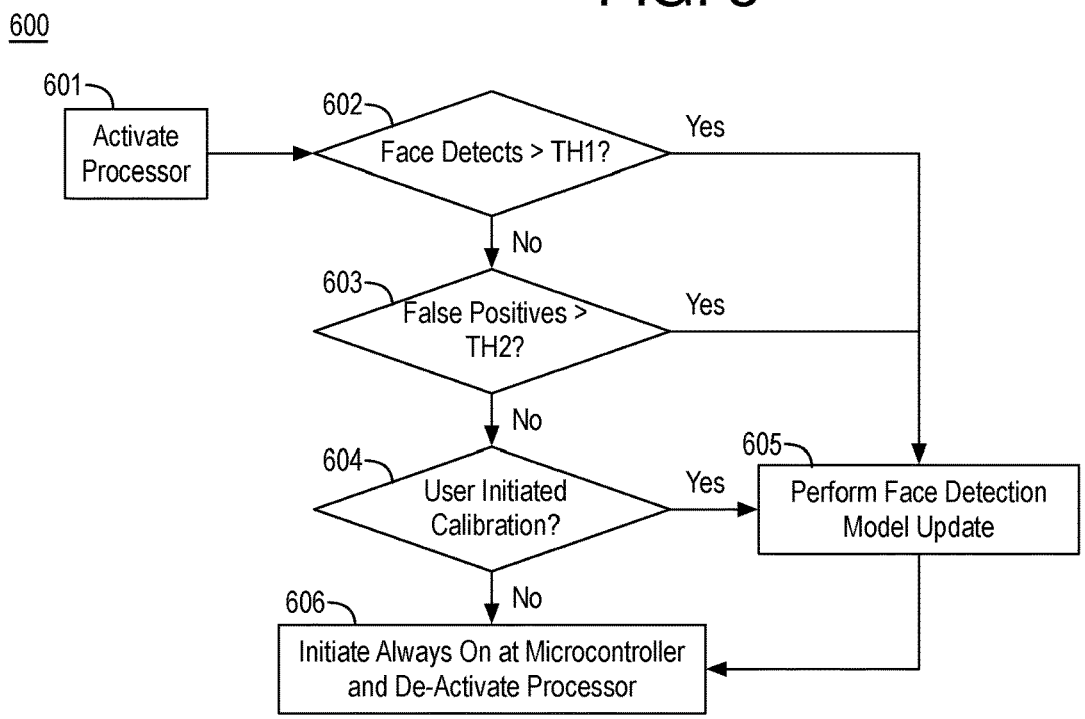
FIG. 6 is a flow diagram illustrating an example process for initiating an update to a face detection model implemented at a low power microcontroller.

FIG. 6 is a flow diagram illustrating an example process 600 for initiating an update to a face detection model implemented at a low power microcontroller, arranged in accordance with at least some implementations of the present disclosure. Process 600 may include one or more operations 601-606 as illustrated in FIG. 6. Process 600 or portions thereof may be performed by any device or system discussed herein, such as system 100.

Process 600 begins at operation 601, where processor 102 is activated. Processor 102 may be activated via face detection signal 132 or by any other wake instantiation. Processing continues at operation 602, where a determination is made as to whether a number of face detections from microcontroller 101 is greater than a threshold. The threshold may provide for a periodic update to the face detection model. The threshold may be any suitable number such as 20 k, 30 k, 40 k, etc. In an embodiment, instead of a number of face detections threshold, operation 602 may implement a time since last update threshold of, for example, 3 months, 6 months, etc. If the threshold is satisfied, processing continues at operation 605, where a face detection model update is performed. The face detection model update may be performed using any suitable technique or techniques such as those discussed with respect to FIG. 4 and the face detection model is stored to microcontroller 101.

If not, processing continues at operation 603, where a determination is made as to whether a number of face detection false positives from microcontroller 101 is greater than a threshold. The threshold may provide for updates to the face detection model upon a certain number of errors occurring. The threshold may be any suitable number such as 200, 500, 1 k, etc. If the threshold is satisfied, processing continues at operation 605, where a face detection model update is performed as discussed above.

If not, processing continues at operation 604, where a determination is made as to whether a user initiated calibration has been requested. The user initiated calibration may be made using any suitable technique or techniques such as the user entering a software command, prompting the user for a request to update, etc. In some embodiments, the prompting of a user may be made in conjunction with one of the thresholds of operations 602, 603 being satisfied. If the user initiated calibration has been requested, processing continues at operation 605, where a face detection model update is performed as discussed.

If not, processing continues at operation 606 (or processing continues at operation 606 from operation 605), where, upon a timeout being reached, based on a command from a user, etc., a signal is sent to microcontroller 101 to implement always on face detection, and processor 102 is returned to an ultra low power, low power, or standby power state.

Figure 7:
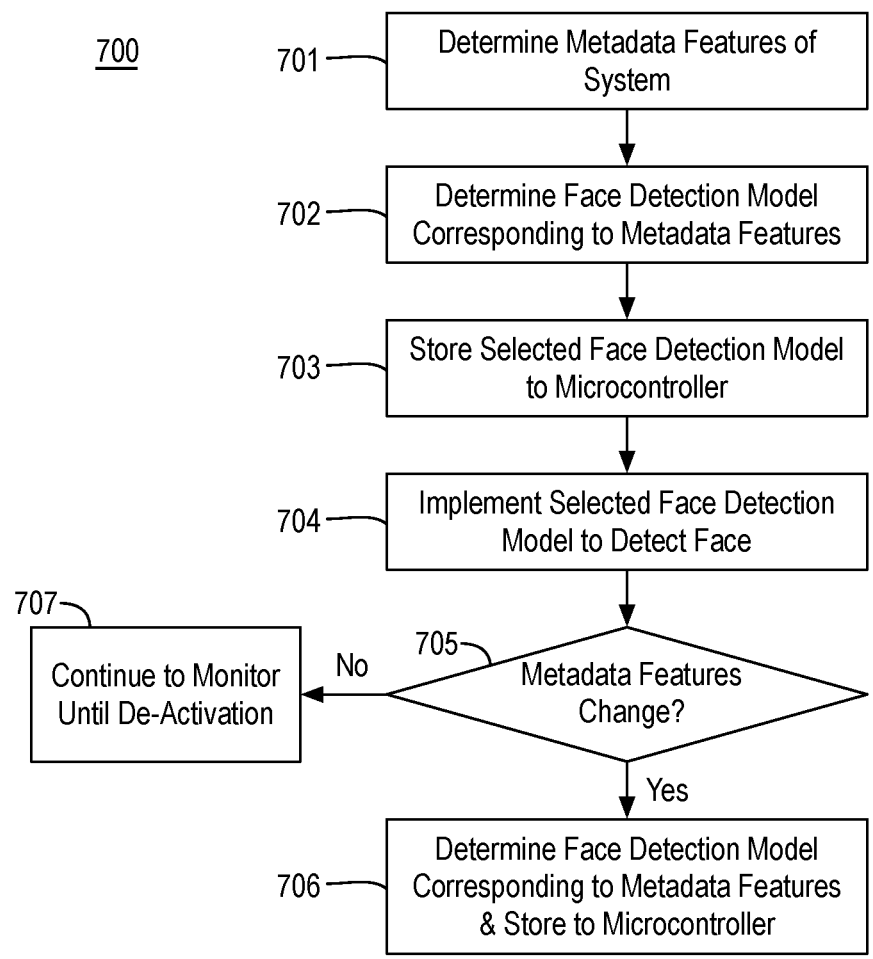
FIG. 7 is a flow diagram illustrating an example process for implementing a face detection model at a low power microcontroller based on metadata features.

FIG. 7 is a flow diagram illustrating an example process 700 for implementing a face detection model at a low power microcontroller based on metadata features, arranged in accordance with at least some implementations of the present disclosure. Process 700 may include one or more operations 701-707 as illustrated in FIG. 7. Process 700 or portions thereof may be performed by any device or system discussed herein, such as system 100.

Process 700 begins at operation 701, where metadata features corresponding to system 100 are determined. The metadata features may be any suitable features. As used herein the term metadata feature indicates a feature outside of an image that may influence the content of the image. Examples include time of day, illumination conditions, geographic locations, etc. For example, a time of day may be the time of day at which the image was acquired (and may include date and year) and such a metadata feature may influence the (assumed) ambient lighting condition of the image, whether the image was in our out of doors, a user the image is likely to include, etc. An image capture condition may include camera characteristics, a light sensor value corresponding to the image capture, etc. and such a metadata feature may again influence the ambient lighting condition of the image. A geographic location may be the latitudinal and longitudinal coordinates at which the image was acquired (and may include street address, etc.) and such a metadata feature may influence the (assumed) ambient lighting condition of the image, whether the image was in our out of doors, a user the image is likely to include, etc.

Processing continues at operation 702, where a face detection model corresponding to the metadata feature or feature combination determined at operation 701 is determined. For example, processor 102 may access a look up table or the like that references a particular face detection model for the metadata feature or feature combination. Such mapping from metadata feature or feature combination to face detection model may be made using any suitable technique or techniques. In some embodiments, the metadata feature or feature combination may be binned to a particular metadata feature range or ranges of feature combinations and the face detection model corresponding to the range of ranges of feature combinations may be selected. For example, for a 7:30 AM metadata feature stamp, a face detection model corresponding to a range of 6 AM-10 AM may be selected.

Each of the face detection models may have been trained as discussed with respect to FIG. 4 such that each face detection model was trained from a training set including images from the particular feature range or ranges of feature combinations. For example, with reference to FIG. 4, metadata feature(s) 402 may indicate a range of a feature (e.g., a range of times, locations, illumination conditions, etc.) or features such that each image of training set of images 401 has metadata feature(s) 402. Similarly, metadata feature(s) 404 may indicate a range of a feature or features such that each image of training set of images 403 has metadata feature(s) 404 and metadata feature(s) 406 may indicate a range of a feature or features such that each image of training set of images 405 has metadata feature(s) 406. In the context of the example, three face detection models 411 are generated, one for each of training sets of images 401, 403, 405 and corresponding metadata feature(s) 402, 404, 406. Although illustrated with respect to three training sets of images 401, 403, 405, corresponding metadata feature(s) 402, 404, 406, and face detection models 411, any number of training sets of images, corresponding metadata feature(s), and face detection models may be implemented.

Processing continues at operation 703, where the selected face detection model is stored, as an updated face detection model, to microcontroller 101 for implementation. Processing continues at operation 704, where the selected face detection model is implemented by microcontroller 101 (after initialization of always on face detection by microcontroller 101 and processor 102 transitioning to an ultra low power, standby, or low power mode) to detect a face as discussed herein. Processing continues at operation 705, where, upon detection of a face and power up of processor 102, a determination is made as to whether a metadata features change for system 100 has occurred. If no change is detected, processing continues at operation 707 where continuous monitoring is performed to determine whether a metadata feature change occurs at system 100. If so, processing continues at operation 706, where a face detection model corresponding to the metadata feature or feature combination is determined and stored to microcontroller 101 as discussed with respect to operations 702, 703.

Figure 8:
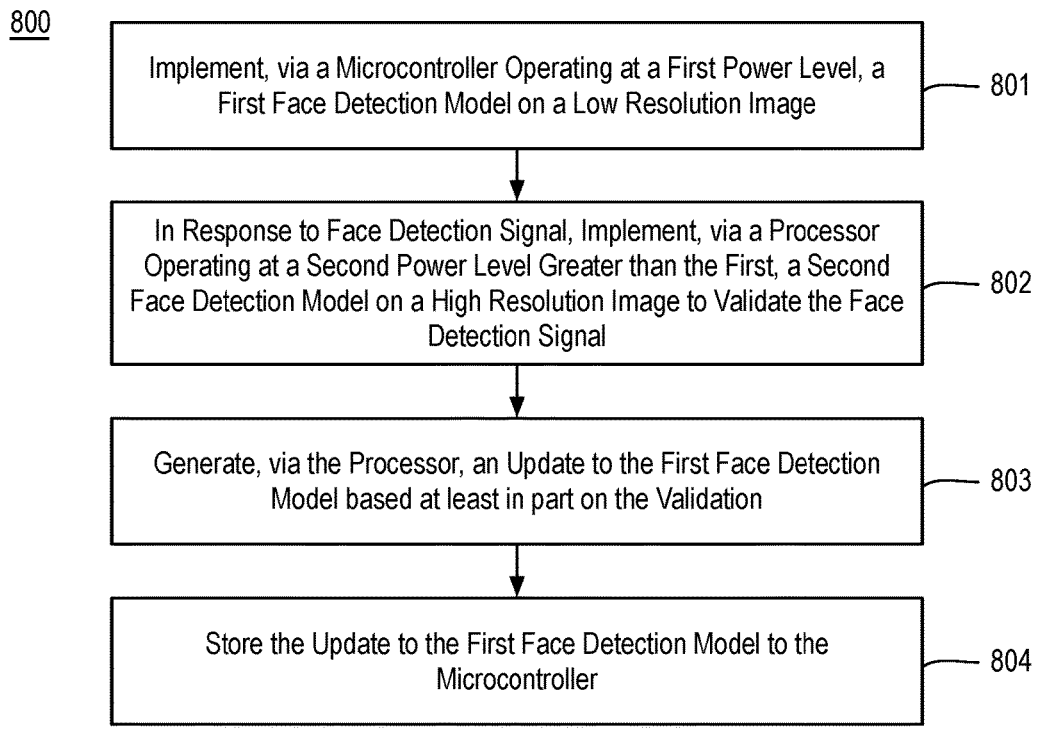
FIG. 8 is a flow diagram illustrating an example process for face detection in an always architecture.

FIG. 8 is a flow diagram illustrating an example process 800 for face detection in an always architecture, arranged in accordance with at least some implementations of the present disclosure. Process 800 may include one or more operations 801-804 as illustrated in FIG. 8. Process 800 may form at least part of face detection and device wake techniques. By way of non-limiting example, process 800 may form at least part of face detection and device wake techniques performed by system 100 as discussed herein. Furthermore, process 800 will be described herein with reference to system 900 of FIG. 9.

Figure 9:
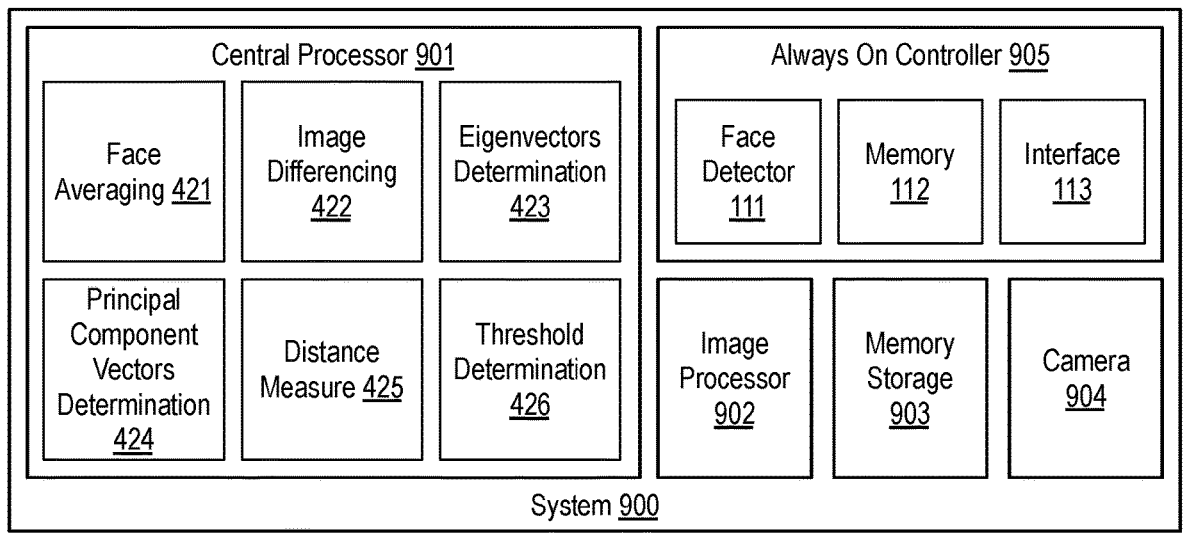
FIG. 9 is an illustrative diagram of an example system for face detection in an always architecture.

FIG. 9 is an illustrative diagram of an example system 900 for face detection in an always architecture, arranged in accordance with at least some implementations of the present disclosure. As shown in FIG. 9, system 900 may include a central processor 901, an image processor 902, a memory storage 903, a camera 904, and an always on controller (e.g., microcontroller) 905. Also as shown, central processor 901 includes or implements face averaging module 421, image differencing module 422, Eigenvectors determination module 423, principal component vectors determination module 424, distance measure module 425, and threshold generation module 426. Always on controller 905 includes or implements face detector 111, memory 112, and interface 113. Such components or modules may be implemented to perform operations as discussed herein. Memory storage 903 may store images, face detection models, face detection model updates, or any other data discussed herein.

As shown, in some examples, one or more of face averaging module 421, image differencing module 422, Eigenvectors determination module 423, principal component vectors determination module 424, distance measure module 425, and threshold generation module 426 are implemented via central processor 901. In other examples, one or more or portions of face averaging module 421, image differencing module 422, Eigenvectors determination module 423, principal component vectors determination module 424, distance measure module 425, and threshold generation module 426 are implemented via image processor 902, a video processor, or a graphics processor. In yet other examples, one or more or portions of face averaging module 421, image differencing module 422, Eigenvectors determination module 423, principal component vectors determination module 424, distance measure module 425, and threshold generation module 426 are implemented via an image or video processing pipeline or unit.

Image processor 902 may include any number and type of graphics, image, or video processing units that may provide the operations as discussed herein. In some examples, image processor 902 may be an image signal processor. Such operations may be implemented via software or hardware or a combination thereof. For example, image processor 902 may include circuitry dedicated to manipulate image data obtained from memory storage 903. Central processor 901 may include any number and type of processing units or modules that may provide control and other high level functions for system 900 and/or provide any operations as discussed herein. Memory storage 903 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory storage 903 may be implemented by cache memory.

In an embodiment, one or more or portions of face averaging module 421, image differencing module 422, Eigenvectors determination module 423, principal component vectors determination module 424, distance measure module 425, and threshold generation module 426 are implemented via an execution unit (EU) of image processor 902. The EU may include, for example, programmable logic or circuitry such as a logic core or cores that may provide a wide array of programmable logic functions. In an embodiment, one or more or portions of face averaging module 421, image differencing module 422, Eigenvectors determination module 423, principal component vectors determination module 424, distance measure module 425, and threshold generation module 426 are implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, one or more or portions of face averaging module 421, image differencing module 422, Eigenvectors determination module 423, principal component vectors determination module 424, distance measure module 425, and threshold generation module 426 may be implemented via an application specific integrated circuit (ASIC). The ASIC may include an integrated circuitry customized to perform the operations discussed herein. Camera 904 may include any camera having any suitable lens and image sensor and/or related hardware for capturing images or video.

Returning to discussion of FIG. 8, process 800 begins at operation 801, where a first face detection model is implemented on a low resolution image using a microcontroller operating at a first power level. In an embodiment, the microcontroller provides a face detection signal in response to a positive face detection corresponding to the first low resolution image. The first face detection model may be any suitable model. In an embodiment, first face detection model is a principal component analysis face detection model. Furthermore, the first power level may be any suitable power. In an embodiment, the first power level is not more than 10 mW.

Processing continues at operation 802, where, in response to the face detection signal, a processor physically separate from the microcontroller implements a second face detection model on a high resolution image at a second power level greater than the first power level to validate the face detection signal. The second face detection model may be any suitable model. In an embodiment, the second face detection model is a principal component analysis face detection model. In an embodiment, the second face detection model is a convolutional neural network face detection model. The second power level may be any suitable power. In an embodiment, the second power level is not less than 0.5 W.

Processing continues at operation 803, where the processor generates an update to the first face detection model based at least in part on the validation. In an embodiment, the face detection is validated as a positive face detection and the processor generates the update to the first face detection model by training a third face detection model using a training corpus including multiple validated images (e.g., images validated as positive face detections) including an image corresponding to the high resolution image (e.g., a downsampled version of the high resolution image) such that the update to the first face detection model includes the third face detection model. In an embodiment, the processor is to train the third face detection model in response to a threshold number of face detection signals from the microcontroller being satisfied.

In an embodiment, the face detection is invalidated as a false positive face detection and the processor generates the update to the first face detection model by determining a third face detection model having a negative face detection result corresponding to the high resolution mage such that the update to the first face detection model includes the third face detection model. In an embodiment, the third face detection model consists of an updated threshold to the first face detection model.

In an embodiment, the processor generates the update to the first face detection model by training a third face detection model using a training corpus comprising a plurality of validated images with one or more common metadata features such that the update to the first face detection model comprises the third face detection model. In an embodiment, the processor is to store the update in response to the one or more common metadata features being detected for the system. In an embodiment, the one or more common metadata features include one of a time of day, an image capture condition, or a geographic location of the plurality of validated images.

In an embodiment, the processor generates the update to the first face detection model by training a third face detection model using a training corpus including multiple validated images acquired in response to a user request such that the update to the first face detection model includes the third face detection model.

Processing continues at operation 804, where the processor stores the update to the first face detection model to the microcontroller. In an embodiment, the processor stores the update by transmitting the update to the microcontroller. In an embodiment, the processor stores the update by allowing the microcontroller to retrieve the update from the processor.

Various components of the systems described herein may be implemented in software, firmware, and/or hardware and/or any combination thereof. For example, various components of the systems discussed herein may be provided, at least in part, by hardware of a computing System-on-a-Chip (SoC) such as may be found in a computing system such as, for example, a smartphone. Those skilled in the art may recognize that systems described herein may include additional components that have not been depicted in the corresponding figures. For example, the systems discussed herein may include additional components such as communications modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems discussed herein or any other module or component as discussed herein.

As used in any implementation described herein, the term "module" or "component" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 10:
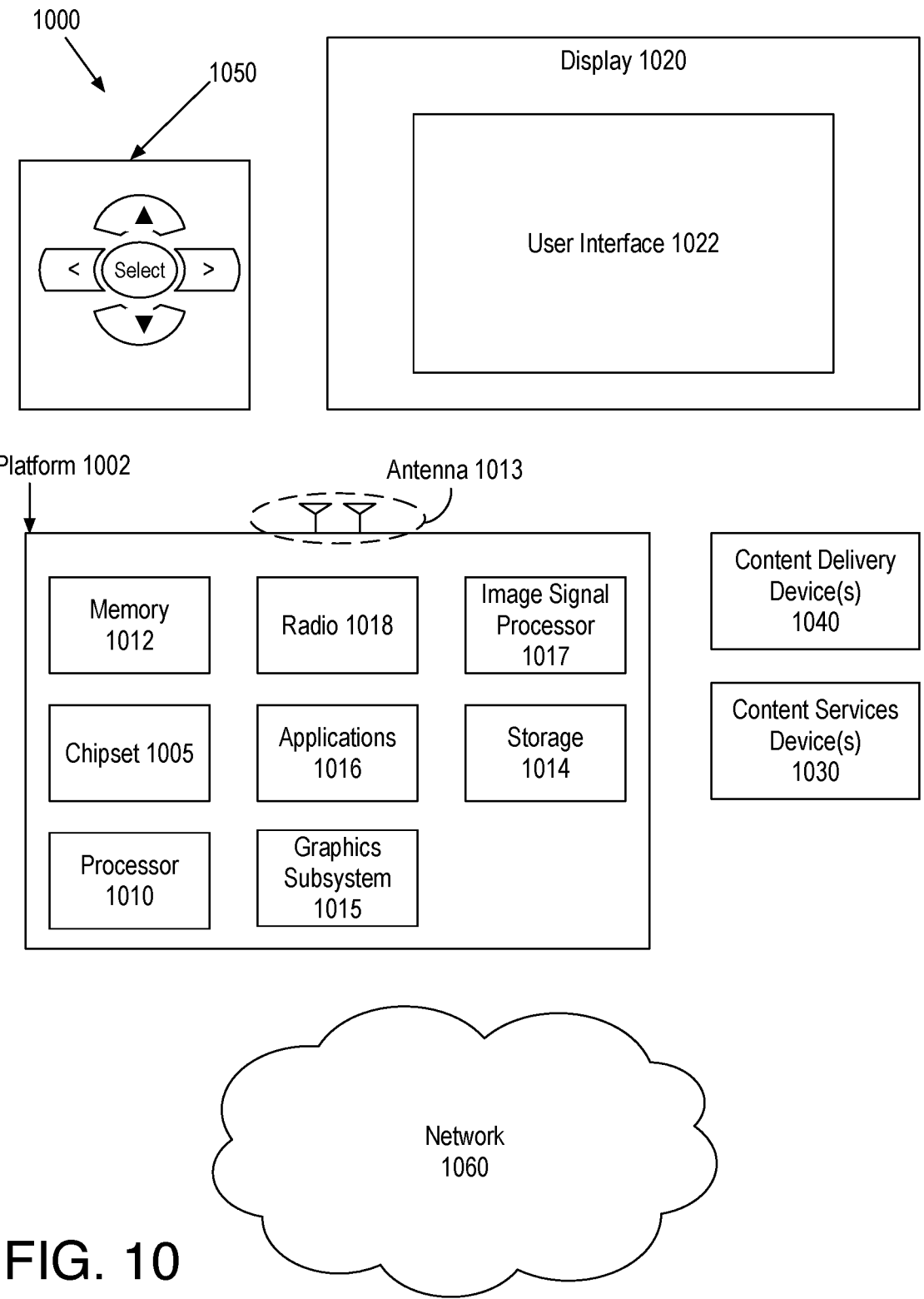
FIG. 10 is an illustrative diagram of an example system.

FIG. 10 is an illustrative diagram of an example system 1000, arranged in accordance with at least some implementations of the present disclosure. In various implementations, system 1000 may be a mobile system although system 1000 is not limited to this context. System 1000 may implement and/or perform any modules or techniques discussed herein. For example, system 1000 may be incorporated into a personal computer (PC), server, laptop computer, ultra-laptop computer, tablet, touch pad, portable computer, handheld computer, palmtop computer, personal digital assistant (PDA), cellular telephone, combination cellular telephone/PDA, television, smart device (e.g., smartphone, smart tablet or smart television), mobile internet device (MID), messaging device, data communication device, cameras (e.g. point-and-shoot cameras, super-zoom cameras, digital single-lens reflex (DSLR) cameras), and so forth. In some examples, system 1000 may be implemented via a cloud computing environment.

In various implementations, system 1000 includes a platform 1002 coupled to a display 1020. Platform 1002 may receive content from a content device such as content services device(s) 1030 or content delivery device(s) 1040 or other similar content sources. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016 and/or radio 1018. Chipset 1005 may provide intercommunication among processor 1010, memory 1012, storage 1014, graphics subsystem 1015, applications 1016 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image or video frame processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/or display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may include a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
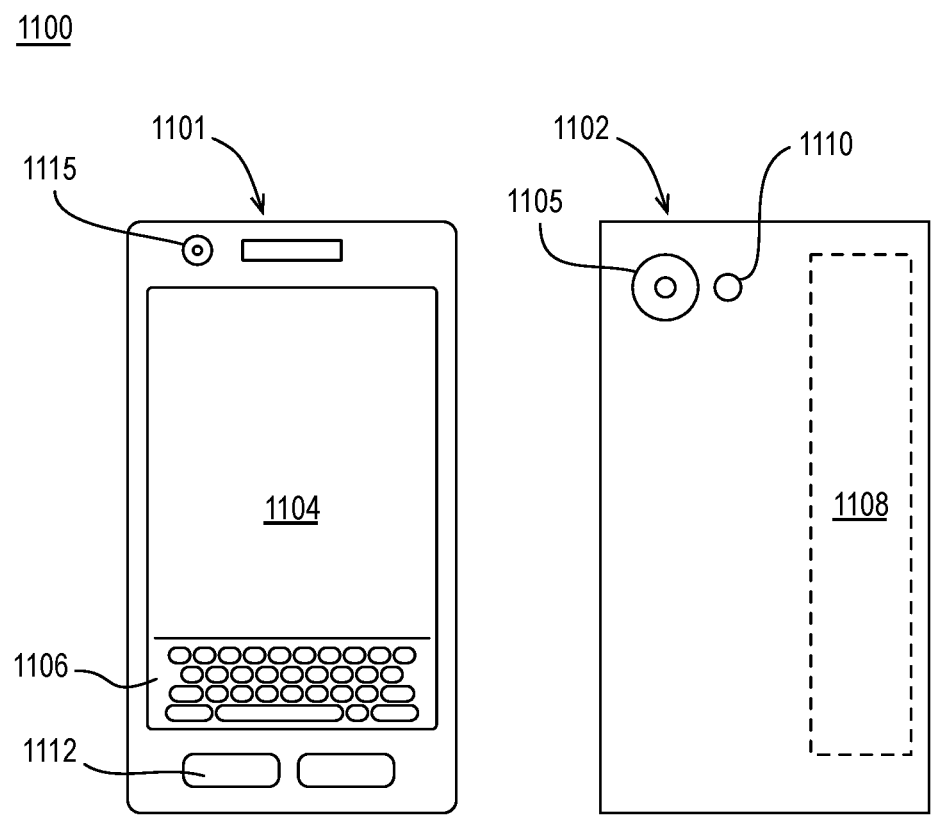
FIG. 11 illustrates an example small form factor device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, camera 1115, a camera 1105, and an integrated antenna 1108. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include camera 1105 and a flash 1110 integrated into back 1102 (or elsewhere) of device 1100 and camera 1115 integrated into front 1101 of device 1100. In some embodiments, either or both of cameras 1115, 1105 may be moveable with respect to display 1104. Camera 1115 and/or camera 1105 may be components of an imaging module or pipeline to originate color image data processed into streaming video that is output to display 1104 and/or communicated remotely from device 1100 via antenna 1108 for example. For example, camera 1115 may capture input images and eye contact corrected images may be provided to display 1104 and/or communicated remotely from device 1100 via antenna 1108.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A system comprising:
   a microcontroller to implement, at a first power level, a first face detection model on a low resolution image, the microcontroller to provide a face detection signal in response to a positive face detection corresponding to the low resolution image; and
   a processor coupled to the microcontroller, the processor, in response to the face detection signal, to implement, at a second power level greater than the first power level, a second face detection model on a high resolution image to validate the face detection signal, to generate an update to the first face detection model based at least in part on the validation, and to store the update to the first face detection model to the microcontroller.

2. The system of claim 1, wherein the face detection is validated as a positive face detection and the processor to generate the update to the first face detection model comprises the processor to:
   train a third face detection model using a training corpus comprising a plurality of validated images comprising an image corresponding to the high resolution image, wherein the update to the first face detection model comprises the third face detection model.

3. The system of claim 2, wherein the processor to train the third face detection model is in response to a threshold number of face detection signals from the microcontroller being satisfied.

4. The system of claim 1, wherein the face detection is invalidated as a false positive face detection and the processor to generate the update to the first face detection model comprises the processor to:
   determine a third face detection model having a negative face detection result corresponding to the high resolution image, wherein the update to the first face detection model comprises the third face detection model.

5. The system of claim 4, wherein the third face detection model consists of an updated threshold to the first face detection model.

6. The system of claim 1, wherein the processor to generate the update to the first face detection model comprises the processor to:
   train a third face detection model using a training corpus comprising a plurality of validated images with one or more common metadata features, wherein the update to the first face detection model comprises the third face detection model.

7. The system of claim 6, wherein the processor to store the update is in response to the one or more common metadata features being detected for the system.

8. The system of claim 6, wherein the one or more common metadata features comprise one of a time of day, an image capture condition, or a geographic location of the plurality of validated images.

9. The system of claim 1, wherein the processor to generate the update to the first face detection model comprises the processor to:
   train a third face detection model using a training corpus comprising a plurality of validated images acquired in response to a user request, wherein the update to the first face detection model comprises the third face detection model.

10. The system of claim 1, wherein the first face detection model comprises a first principal component analysis face detection model and the second face detection model comprises one of a second principal component analysis face detection model or a convolutional neural network face detection model.

11. The system of claim 1, wherein the first power level is not more than 100 mW and the second power level is not less than 0.5 W.

12. A face detection method for an always architecture comprising:
    implementing, at a microcontroller operating at a first power level, a first face detection model on a low resolution image;
    providing, from the microcontroller, a face detection signal in response to a positive face detection corresponding to the low resolution image;
    implementing, at a processor operating at a second power level greater than the first power level and in response to the face detection signal, a second face detection model on a high resolution image to validate the face detection signal;
    generating, at the processor, an update to the first face detection model based at least in part on the validation; and
    storing, to the microcontroller, the update to the first face detection model.

13. The method of claim 12, wherein the face detection is validated as a positive face detection and generating the update to the first face detection model comprises:
    training a third face detection model using a training corpus comprising a plurality of validated images comprising one of the low resolution image or the high resolution image, wherein the update to the first face detection model comprises the third face detection model.

14. The method of claim 12, wherein the face detection is invalidated as a false positive face detection and generating the update to the first face detection model comprises:
    determining a third face detection model having a negative face detection result corresponding to the high resolution image, wherein the update to the first face detection model comprises the third face detection model.

15. The method of claim 12, wherein generating the update to the first face detection model comprises:
    training a third face detection model using a training corpus comprising a plurality of validated images with one or more common metadata features, wherein the update to the first face detection model comprises the third face detection model.

16. The method of claim 15, wherein the storing the update is in response to the one or more common metadata features being detected for the system and the one or more common metadata features comprise one of a time of day, an image capture condition, or a geographic location of the plurality of validated images.

17. At least one non-transitory machine readable medium comprising a plurality of instructions that, in response to being executed on a processor, cause the device to perform face detection for an always architecture by:
receiving, in response to a microcontroller operating at a first power level implementing a first face detection model on a low resolution image, a face detection signal indicating a positive face detection in the low resolution image;
implementing, at the processor operating at a second power level greater than the first power level and in response to the face detection signal, a second face detection model on a high resolution image to validate the face detection signal;
generating, at the processor, an update to the first face detection model based at least in part on the validation; and
transmitting, from the processor, the update to the first face detection model to the microcontroller.

18. The non-transitory machine readable medium of claim 17, wherein the face detection is validated as a positive face detection and generating the update to the first face detection model comprises:
training a third face detection model using a training corpus comprising a plurality of validated images comprising one of the low resolution image or the high resolution image, wherein the update to the first face detection model comprises the third face detection model.

19. The non-transitory machine readable medium of claim 17, wherein the face detection is invalidated as a false positive face detection and generating the update to the first face detection model comprises:
determining a third face detection model having a negative face detection result corresponding to the high resolution image, wherein the update to the first face detection model comprises the third face detection model.

20. The non-transitory machine readable medium of claim 17, wherein generating the update to the first face detection model comprises:
training a third face detection model using a training corpus comprising a plurality of validated images with one or more common metadata features, wherein the update to the first face detection model comprises the third face detection model.

21. The non-transitory machine readable medium of claim 20, wherein the storing the update is in response to the one or more common metadata features being detected for the system and the one or more common metadata features comprise one of a time of day, an image capture condition, or a geographic location of the plurality of validated images.

* * * * *